United States Patent [19]

Kosaka et al.

[11] Patent Number: 5,379,322
[45] Date of Patent: Jan. 3, 1995

[54] BASEBAND SIGNAL GENERATOR FOR DIGITAL MODULATOR

[75] Inventors: Akio Kosaka, Gifu; Mitsufumi Yoshimoto, Nara; Mitsuji Hama, Osaka; Toshinori Iinuma, Gifu, all of Japan

[73] Assignees: Sanyo Electric Co., Ltd., Osaka; Tottori Sanyo Electric Co., Ltd., Tottori, both of Japan

[21] Appl. No.: 969,947

[22] Filed: Oct. 30, 1992

[30] Foreign Application Priority Data

Jan. 7, 1992 [JP] Japan .................................. 4-000835
Jan. 7, 1992 [JP] Japan .................................. 4-000836
Jan. 7, 1992 [JP] Japan .................................. 4-000837

[51] Int. Cl.$^6$ ............................................ H04L 27/10
[52] U.S. Cl. ................................. 375/60; 375/54; 332/103
[58] Field of Search ................ 375/8, 9, 52, 53, 54, 375/56, 67, 60, 57, 59; 332/103

[56] References Cited

U.S. PATENT DOCUMENTS

| 5,175,514 | 12/1992 | Iinuma et al. | 375/53 |
| 5,177,769 | 1/1993 | Arnold et al. | 375/60 |
| 5,260,973 | 11/1993 | Watanabe | 375/59 |

Primary Examiner—Stephen Chin
Assistant Examiner—Duane Kobayashi
Attorney, Agent, or Firm—Peter L. Michaelson

[57] ABSTRACT

A baseband signal generator according to the present invention performs differential encoding and mapping processings for a digital baseband signal and limits bandwidths of the obtained symbol mapping data of an I phase and a Q phase by digital filters. Each digital filter includes a circuit for accumulating symbol mapping data corresponding to a plurality of symbol sections, a plurality of ROMs provided corresponding to the plurality of symbol sections for storing symbol data corresponding to a predetermined filter waveform, and an adder for adding symbol data output from there ROMs. The adder outputs a digital baseband signal whose bandwidth is limited, which signal is converted into an analog baseband signal by a D/A converter and supplied to an analog modulation unit.

6 Claims, 18 Drawing Sheets

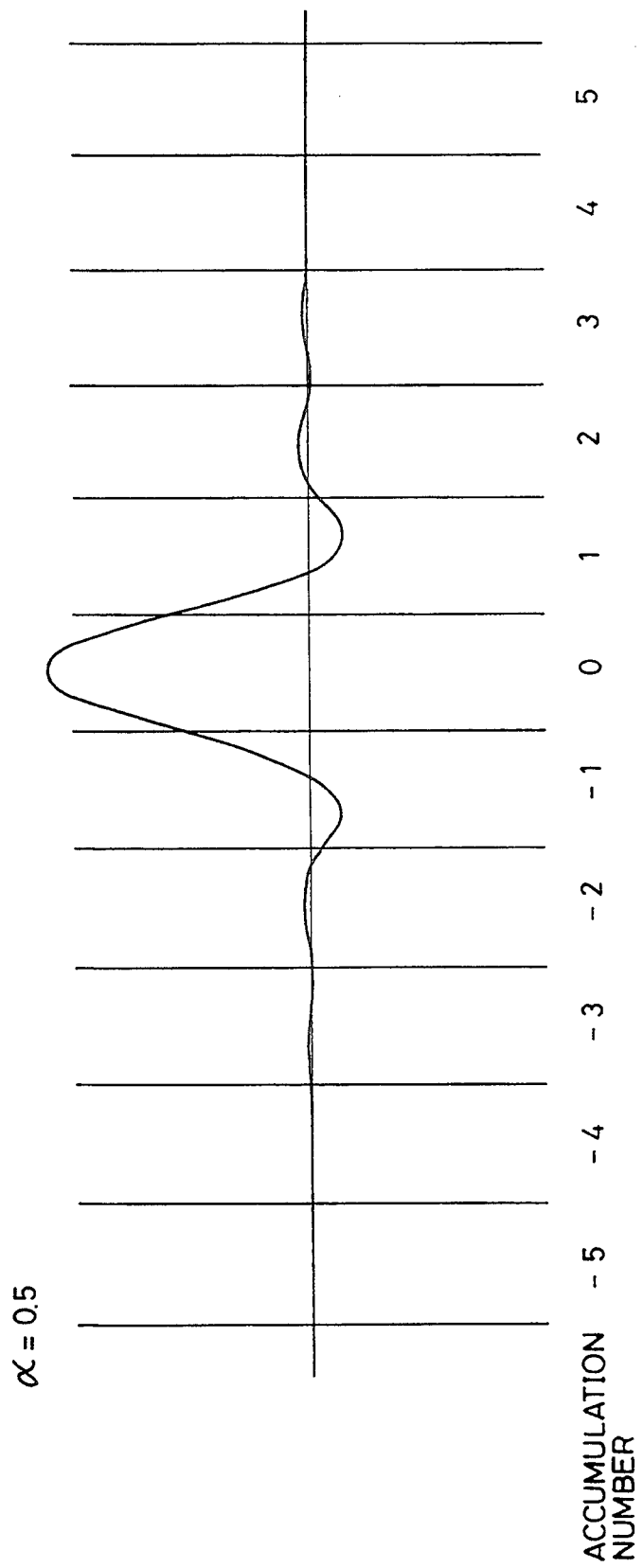

FIG. 14

| PHASE POINT | SM 2 | SM 1 | SM 0 | I 1 | I 0 | Q 1 | Q 0 |
|---|---|---|---|---|---|---|---|
| 0 | 0 | 0 | 0 | 1 | 1 | 1 | 0 |
| 1 | 0 | 0 | 1 | 1 | 0 | 1 | 1 |
| 2 | 0 | 1 | 0 | 0 | 1 | 1 | 1 |
| 3 | 0 | 1 | 1 | 0 | 0 | 1 | 0 |
| 4 | 1 | 0 | 0 | 0 | 0 | 0 | 1 |
| 5 | 1 | 0 | 1 | 0 | 1 | 0 | 0 |
| 6 | 1 | 1 | 0 | 1 | 0 | 0 | 0 |
| 7 | 1 | 1 | 1 | 1 | 1 | 0 | 1 |

BASEBAND SIGNAL GENERATOR FOR DIGITAL MODULATOR

BACKGROUND OF THE INVENTION

1. Field of the Invention

The present invention relates generally to baseband signal generators for digital modulators, and more particularly, to a baseband signal generator for a digital modulator used as a MODEM for a digital communication equipment such as a land mobile radio telephone, a portable radio telephone and a cordless telephone.

2. Description of the Background Art

A conventional digital communication apparatus modulates a carrier signal in response to a digital information signal (baseband signal) to transmit the information signal in order to achieve efficient transmission.

Such modulation systems include an amplitude modulation system wherein an amplitude of a carrier signal is changed in response to a digital baseband signal (a modulating wave signal), a frequency modulating system wherein a frequency of a carrier is deviated in response to a modulating wave signal, a phase modulating system wherein a phase of a carrier is changed in response to a modulating wave signal and an amplitude phase modulating system wherein an amplitude and a phase of a carrier are individually changed in response to a modulating wave signal.

The carrier signal (modulated signal) $S(t)$ thus modulated in response to a modulating wave signal can be generally expressed by the following equation.

$$S(t) = A(t) \sin \{\omega_c t + \phi(t)\} \quad (1)$$
$$= A(t) \sin \phi(t) \cdot \cos \omega_c t + A(t) \cos \phi(t) \cdot \sin \omega_c t$$

Herein, $A(t)$ denotes an amplitude, $\omega_c$ denotes a carrier frequency and $\phi(t)$ denotes a phase of a modulating wave signal.

As is clear from the above-described equation (1), the modulated signal can be represented by two components orthogonal to each other, that is, by a sum of an in-phase (I phase) component (the first term of the above-described equation (1)) and a quadrature phase (Q phase) component (the second term of the above-described equation (1)). Such a modulated signal can be therefore formed by using a quadrature modulator.

FIGS. 1 and 2 are a block diagram and a spatial diagram schematically showing the principle of such a quadrature modulator, respectively. It should be noted that the following example shows a phase modulating system for changing a phase of a carrier in response to a baseband signal, wherein an amplitude $A(t)$ is fixed to "1".

With reference to FIG. 1, a mapping circuit 2 outputs I phase and Q phase components of a modulating wave signal as rectangular signals in response to a digital baseband signal applied through an input terminal 1. The I phase component is applied to one input of a multiplier 7 through a low pass filter (LPF) 3, while the Q phase component is applied to one input of a multiplier 8 through a low pass filter LPF 4.

A carrier signal $\cos \omega_c t$ is applied from a signal source 5 to the other input of the multiplier 7 which outputs an I phase component $\sin \phi(t) \cdot \cos \omega_c t$ of a modulated signal. A signal $\sin \omega_c t$ obtained by shifting the phase of the carrier signal from the signal source 5 by $\pi/2$ by means of a phase shift circuit 6 is applied to the other input of the multiplier 8 which outputs an Q phase component $\cos \phi(t) \cdot \sin \omega_c t$ of the modulated signal. Thus obtained I phase component and Q phase component can be represented in a one-to-one correspondence on the I and Q coordinates as shown in FIG. 2.

These I phase component and Q phase component are added to each other by an adder 9 to become such a modulated signal as expressed by equation (1), which signal is output from an output terminal 10.

The above described mapping circuit 2 includes two ROMs wherein signal waveform data, which have been obtained in advance by calculation, of I and Q phases of the digital modulating wave signal with their bandwidths being limited are stored, respectively. Such waveform data are read out from the ROMs using the digital baseband signal applied through the input terminal 1 as addresses.

There is a case where M-phase PSK (Phase Shift Keying) signal is generated by using such a quadrature modulator. FIG. 3 is a diagram schematically showing the principle of the generation of $\pi/4$ shift QPSK (Quadli Phase Shift Keying) signal, which signal is one example of such a M-phase PSK signal.

With reference to FIG. 3, it is assumed that a signal point corresponding to I phase component and Q phase component data of a baseband signal (modulating wave signal) at a certain time point exists at one of a, c, e and g on the unit circle having a radius of 1 shown in FIG. 3. At a subsequent time point after a lapse of a predetermined time slot, the signal point shifts to one of the intersections b, d, f and h between two virtual axis obtained by rotating their axis and the Q axis by $\pi/4$ and the unit circle of a radius of 1. The I axis and the Q axis will be rotated by $\pi/4$ for each predetermined time slot in the same manner as described above, whereby the signal point sequentially shifts on the unit circle.

For example, if the signal point initially exists at the point a in FIG. 3 and the baseband signal does not change, the signal point shifts as a point →b point→c point→d point→e point→f point→g point→h point for every predetermined time slot, that is, at every $\pi/4$ rotation of the I axis and the Q axis. In this case, the I and Q phase data each takes the five types of values such as "1", "$1/\sqrt{2}$", "0", "$-1/\sqrt{2}$" and "$-1$" as can be seen from FIG. 4.

On the other hand, according to the digital cellular telecommunication system standard of Japan (RCR) and the cellular telecommunication standard (TIA-IS-54) of the North America, differential encodings are carried out in $\pi/4$ shift QPSK modulation. Because of such differential encoding, it is only necessary to consider a relative phase between continuous symbols. Therefore, by shifting the phase of the signal spatial diagram of FIG. 3 by $\pi/8$ as shown in FIG. 4, data of the I phase and the Q phase have levels of four value. Such $\pi/4$ shift QPSK modulation by such differential encoding is generally referred to as "$\pi/4$ shift DQPSK modulation".

Brief description will be given to a procedure of generating a baseband signal for such $\pi/4$ shift DQPSK modulation. First, an applied serial digital baseband signal is converted into symbol data of $(X_k, Y_k)$ by a serial/parallel conversion circuit. Then, the symbol data $(X_k, Y_k)$ is converted into a quadrature signal $(I_k, Q_k)$ based on the following equation by a differential encoding and mapping circuit.

$$\begin{pmatrix} I_k \\ Q_k \end{pmatrix} = \begin{pmatrix} \cos[\Delta\phi(X_k, Y_k)] & -\sin[\Delta\phi(X_k, Y_k)] \\ \sin[\Delta\phi(X_k, Y_k)] & \cos[\Delta\phi(X_k, Y_k)] \end{pmatrix} \begin{pmatrix} I_{k-1} \\ Q_{k-1} \end{pmatrix}$$

Herein, the above-described $\Delta\phi$ ($X_k$, $Y_k$) is defined based on the following table.

| $X_k$ | 1 | 0 | 0 | 1 |
|---|---|---|---|---|
| $Y_k$ | 1 | 1 | 0 | 0 |
| $\Delta\phi$ | $-3\pi/4$ | $3\pi/4$ | $\pi/4$ | $-\pi/4$ |

Thus obtained signals $I_k$ and $Q_k$ are band-limited by low pass filters and then supplied to a quadrature modulator as an I phase component and a Q phase component of the baseband signal, respectively.

FIG. 5 is a diagram schematically showing a structure of a baseband signal generator which uses such principle and is the background art of the present invention. With reference to FIG. 5, a serial digital baseband signal applied through an input terminal 21 is converted into parallel 2-bit data by a serial/parallel conversion circuit 22. A differential encoding and mapping circuit 23 differentially encodes the current 2-bit data from the serial/parallel conversion circuit 22 and 2-bit data of an immediately preceding clock, while performing mapping on a signal spatial diagram. A timing signal generation circuit 24 is driven by a clock signal having a frequency higher than that of a symbol rate to generate a clock signal for an input signal, a clock signal having a symbol period and clock signals for digital filters.

Symbol mapping data of the I phase and the Q phase output from the differential encoding and mapping circuit 23 are band-limited by digital filters 25 and 26 each having impulse response characteristics of a route Nyquist filter and applied to D/A converters 27 and 28, respectively. As a result, the D/A converters 27 and 28 respectively provide band-limited analog baseband signals of the I phase and the Q phase, which signals are applied to a modulated signal generation unit 31 (corresponding to the elements 5 to 9 of FIG. 1) through output terminals 29 and 30. Then, a generated modulated signal is output through an output terminal 32.

FIG. 6 is a block diagram showing a structure of one digital filter 25 shown in FIG. 6. The other digital filter 26 is also structured similarly to the digital filter 25. The digital filter 25 includes a symbol mapping data accumulation circuit 25a for shifting the symbol mapping data of the I phase supplied from the differential encoding and mapping circuit 23 in response to a clock signal SCK having a symbol period supplied from the timing signal generation circuit 24 and accumulating the shifted data, and an ROM25b for storing a previously calculated waveform obtained by overlapping route Nyquist filter outputs (impulse response signals) as shown in FIG. 7. In FIG. 6, 2 bits of M51 and M50 correspond to the latest symbol mapping data, while 2 bits of P51 and P50 correspond to the oldest symbol mapping data.

The contents stored in the ROM25b are read out based on the symbol mapping data output from the accumulation circuit 25a and 2 bits of time information A1 and A0 supplied from the timing signal generation circuit 24. In an example which will be described in the following, an ROM forming a digital filter of each phase accumulates data corresponding to 5 symbol sections preceding to a center symbol section and following 5 symbol sections, that is, the total of 11 symbol sections (11, as the number of taps of ROM). That is, since the symbol mapping data of each phase has the levels of four values because of the above-described differential encoding, a waveform obtained by overlapping impulse response characteristics corresponding to $4^{11}$ data patterns is stored in advance in the ROM25b of FIG. 6.

An address of such ROM25b requires a total of 24 bits ($=22+2$) including 22 bits ($=11\times 2$) for accumulating the four-value symbol mapping data for 11 symbol sections and 2 bits of time information for data reading. Herein, with a data length of 8 bits, the capacity of the ROM25b is equivalent to $2^{27}$ bits ($=2^{(22+2)}\times 8$). For the I phase and the Q phase in total, such a large ROM capacity as of 268 gigabits ($=2^{27}\times 2=2^{28}$) is required.

On the other hand, as described in "An Experimental TDMA Transmission System Using 1.5 GHz-Band $\pi/4$ Shifted QPSK", ELECTRONIC INFORMATION COMMUNICATION CONFERENCE PROCEEDINGS B-II Vol. J73-B-II No. 11, November 1990, pp. 639–650, it is also possible to allot one ROM for each level of the data, whereby a sum of the outputs of the respective ROMs is taken. In this case, however, 13 bits ($=11+2$) are required for an address of each ROM. With a data length of 8 bits, the capacity of the ROM in each level is equivalent to $2^{16}$ bits ($=2^{(11+2)}\times 8$). Therefore, in a case of data having levels of four values, each of the I phase and the Q phase requires $2^{18}$ bits ($=2^{16}\times 4$). So large a capacity as $2^{18}\times 2=2^{19}$ bits $=524$ kilobits is required for the I phase and the Q phase. As described in the foregoing, the larger a capacity of an ROM or the number of ROMs is required, the more difficult it is to make a modulator as an LSI while decreasing its manufacturing cost.

In a conventional digital modulator, on the other hand, it was not considered how to cope with burst transmission. Burst transmission without considering any countermeasure results in generation of transmission spurious.

More specifically, in the normal burst transmission, the data transmission in effected intermittently as shown in FIG. 8A(a). As shown therein, if the time width of transmission is defined as $T_B$ (sec), the spectrum as expressed by the following equation is generated.

$$A_D(f) = T_B \frac{\sin \pi f T_B}{\pi f T_B} \tag{3}$$

FIG. 8B is a graph showing such spectrum wherein the spurious transmission is caused by the portion indicated with hatching.

In order to prevent generation of such transmission spurious, a generally-called ramp processing for smooth rise and fall of burst as shown in FIG. 8A(b) is required.

FIG. 8A(c) is an enlarged diagram showing transmission waveform in such rising edge and falling edges. The following function is used as a function for the rising.

$$\frac{1}{2} - \frac{1}{2} \cos\left(\pi \frac{t}{2T_s}\right) \tag{4}$$

The following function is used as a function for the falling edge.

$$\frac{1}{2} + \frac{1}{2} \cos\left(\pi \frac{t}{2T_s}\right) \qquad (5)$$

In the above equations (4) and (5), "$T_S$" indicates the symbol period.

However, a conventional system needs an additional ROM dedicated for such a ramp processing. Hence, a digital modulator applicable to burst transmission by a conventional system inevitably requires an ROM having increasingly larger capacity.

SUMMARY OF THE INVENTION

An object of the present invention is to provide a baseband signal generator for a digital modulator which can be readily implemented as an LSI and manufactured at a low cost.

Another object of the present invention is to provide a baseband signal generator for a digital modulator structured without using a large capacity ROM.

A further object of the present invention is to provide a baseband signal generator for a digital modulator applicable to burst transmission without increasing a capacity of an ROM.

In short, the present invention relates to a baseband signal generator for a digital modulator, which includes a circuit for supplying a digital baseband signal, a circuit for performing a differential encoding processing and a mapping processing for the digital baseband signal to convert the signal into a plurality of symbol mapping data of different phases, a plurality of digital filters for limiting respective bandwidths of the plurality of symbol mapping data, and a plurality of D/A converters for converting outputs of the plurality of digital filters into analog baseband signals, each of the above plurality of digital filters including a circuit for accumulating the symbol mapping data by the amount corresponding to a plurality of symbol sections, a plurality of ROMs provided corresponding to the plurality of symbol sections for storing symbol data corresponding to a predetermined filter waveform, and an adder for adding the symbol data read from the plurality of ROMs.

According to another aspect of the present invention, the digital filter includes a plurality of masking circuits for selectively rendering the symbol data read out from the plurality of ROMs to "0", and a mask control circuit responsive to designation of burst transmission for controlling the masking circuits in a predetermined timing.

Therefore, a principal advantage of the present invention resides in that a digital modulator can be readily implemented as an LSI while reducing a manufacturing cost because a baseband signal generator can be implemented with a ROM capacity considerably smaller than that of a conventional baseband signal generator.

A further advantage of the present invention is to implement a baseband signal generator for a digital modulator applicable to burst transmission, in which generation of spurious transmission can be prevented at the time of burst transmission without needing to increase ROM capacity.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a waveform diagram illustrating impulse response characteristics of the digital filter shown in FIG. 5.

FIG. 14 is a truth table for illustrating the principle of a mapping operation shown in FIG. 13.

DESCRIPTION OF THE PREFERRED EMBODIMENTS

Figure 5:
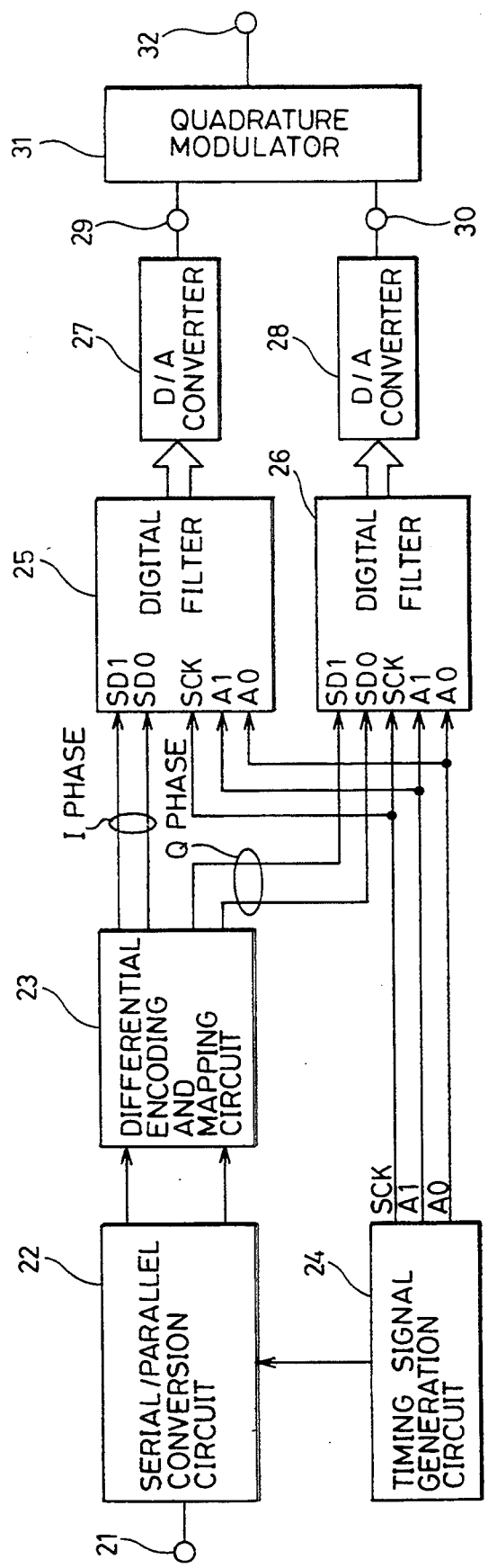
FIG. 5 is a block diagram showing a conventional baseband signal generator for $\pi/4$ shift DQPSK modulation.
Figure 9:
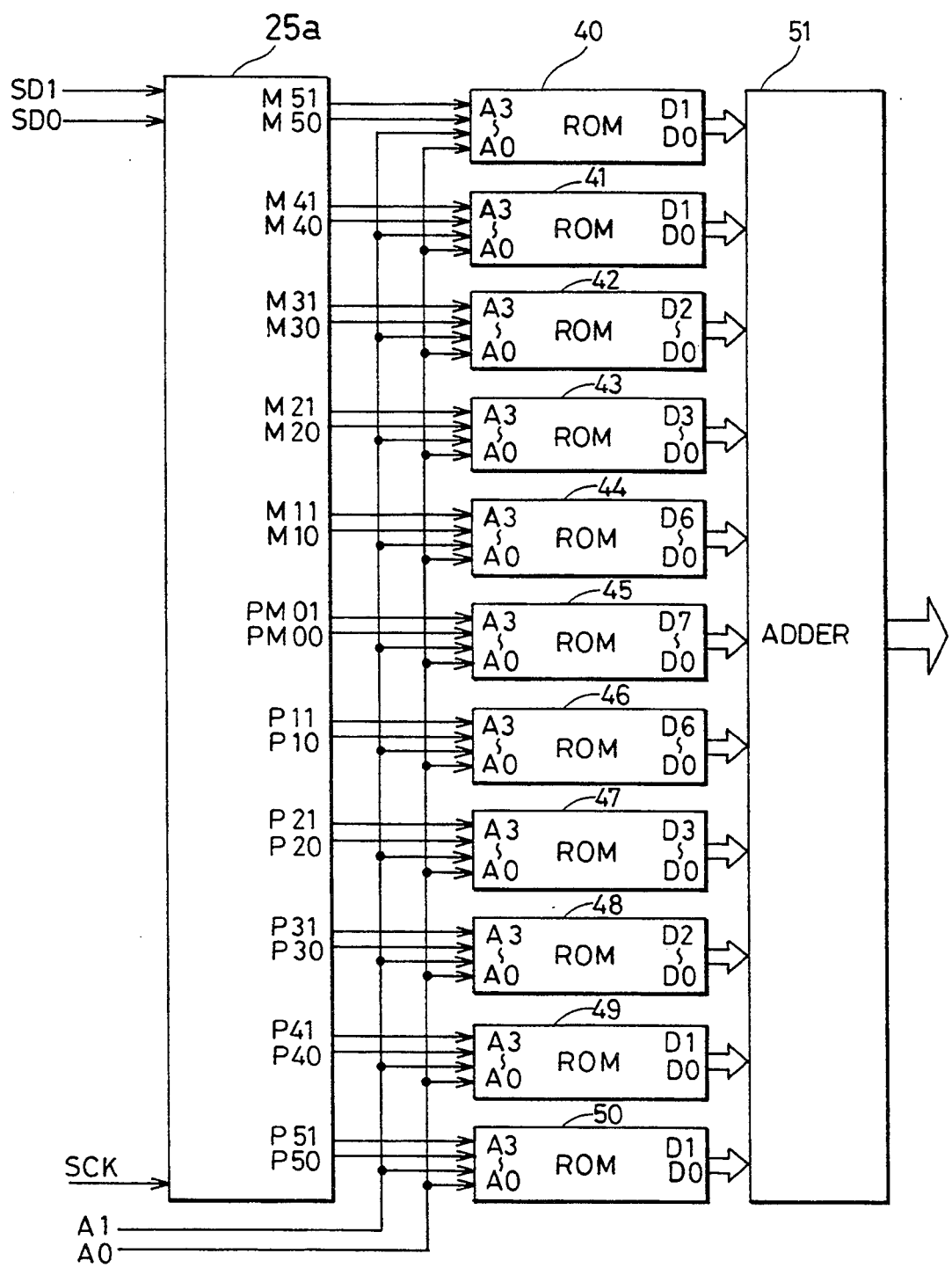
FIG. 9 is a block diagram showing a digital filter constituting a baseband signal generator according to a first embodiment of the present invention.

FIG. 9 is a block diagram showing a digital filter constituting a baseband signal generator according to one embodiment of the present invention. This digital filter corresponds to the digital filter 25 (or 26) of the baseband signal generator shown in FIG. 5. The structure of the remainder, i.e., other than the digital filter, of the baseband signal generator is the same as a conventional example as shown in FIG. 5.

The embodiment of FIG. 9, in which the digital filter is structured by a plurality of ROMs, is intended for providing a method wherein impulse response waveforms of a route Nyquist filter for respective symbol sections are separately accumulated in corresponding ROMs and outputs of the ROMs are added to obtain data of a waveform obtained by overlapping impulse response waveforms. Hereinafter, such process will be referred to as symbol tap divided ROM method.

Figure 6:
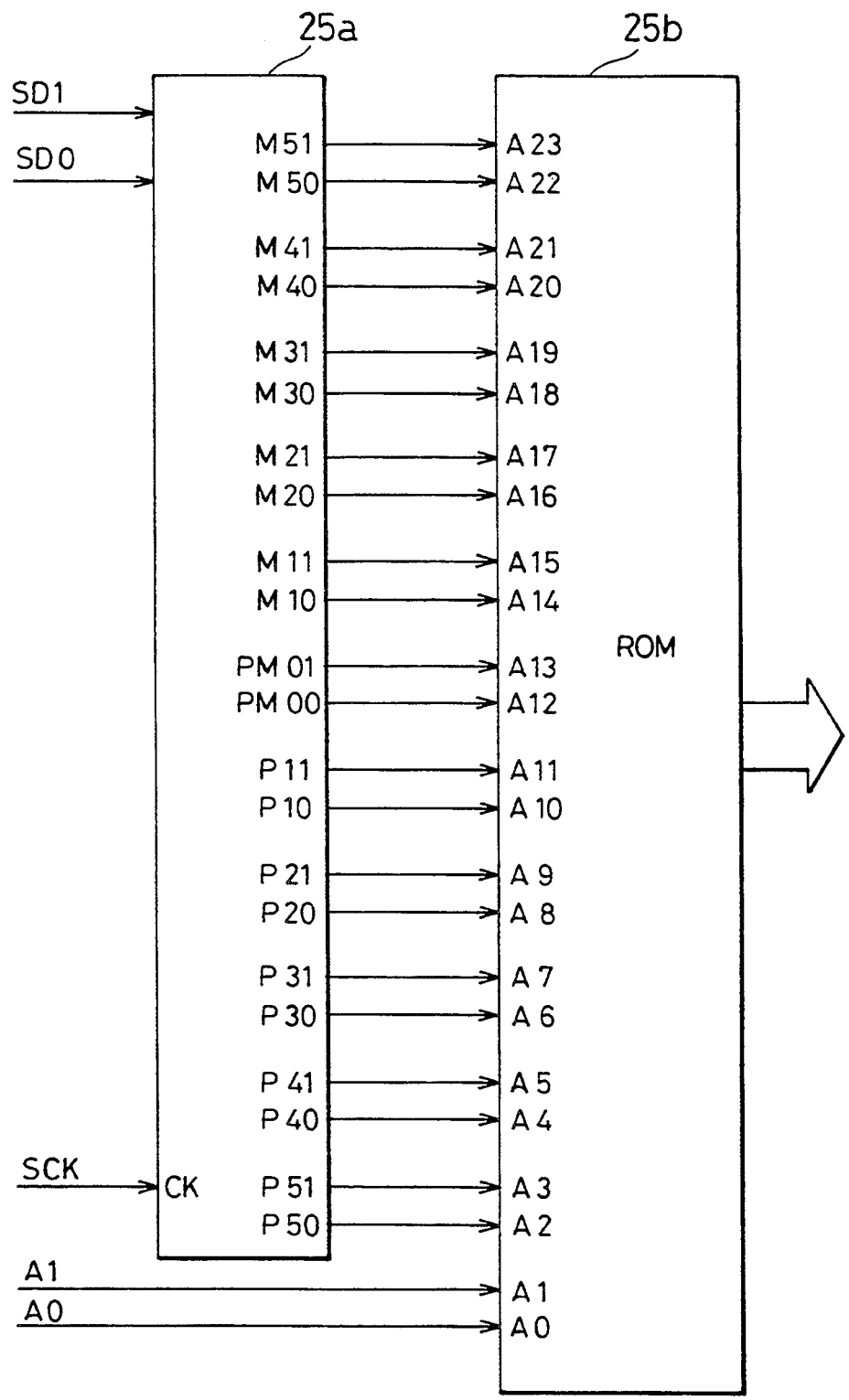
FIG. 6 is a block diagram showing a structure of a digital filter shown in FIG. 5.
Figure 8A:
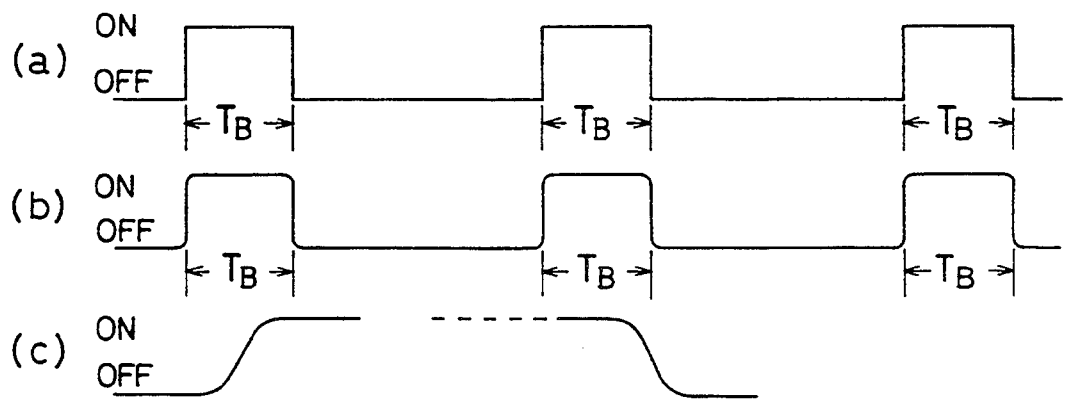
FIGS. 8A and 8B are diagrams schematically illustrating the principle of generation of spurious transmission.
Figure 8B:
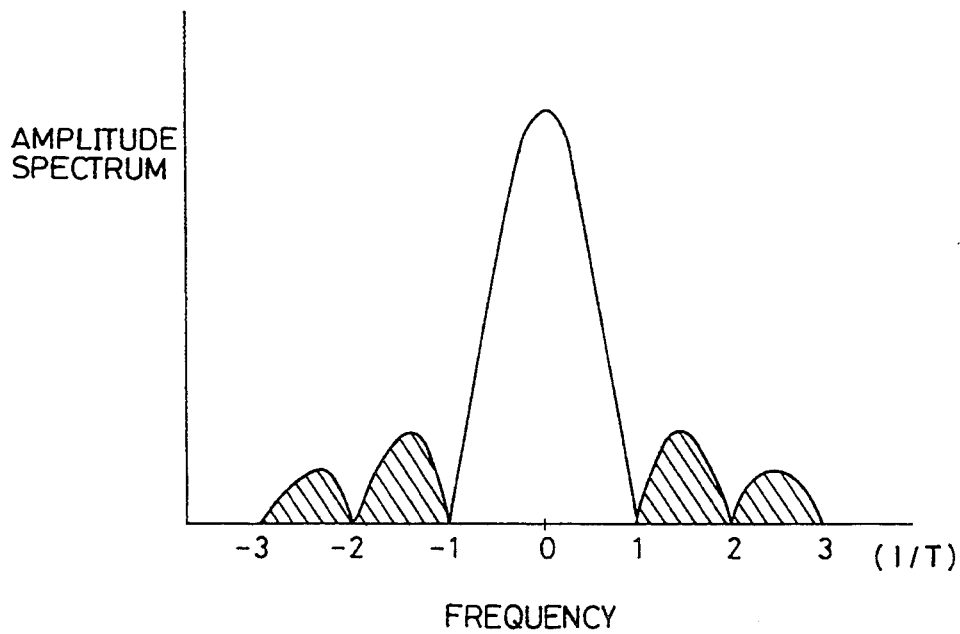

With reference to FIG. 9, a symbol mapping data accumulation circuit 25a is the same as that of FIG. 6, description of which will not be repeated. In the embodiment of FIG. 9, 22-bit symbol mapping data output from the symbol mapping data accumulation circuit 25a are applied to corresponding ROMs 40 to 50 for the respective symbol sections. Each of these ROMs uses its corresponding 2-bit symbol mapping data (A2, A3) from the symbol mapping data accumulation circuit 25a and 2-bit time information (A1, A0) from the timing signal generation circuit 24 (FIG. 5) as address. A data length stored in each ROM varies from one ROM to another ROM depending on a dynamic range in each symbol section of the impulse response waveform of the route Nyquist filter with a roll off factor α of 0.5 as shown in FIG. 7.

More specifically as sown in FIG. 9, symbol data (D0, D1) of a 2-bit data length are supplied from a ROM 40 corresponding to a symbol section of the accumulation number of −5, a ROM 41 corresponding to a symbol section of the accumulation number of −4, a ROM 49 corresponding to a symbol section of the accumulation number of 4 and a ROM 50 corresponding to a symbol section of the accumulation number of 5. This is because determination is made that 2-bit is enough for a response in each of these symbol sections in consideration of a dynamic range of each symbol section. Similarly, symbol data (D0–D2) of a 3-bit data length are supplied from a ROM 42 corresponding to a symbol section of the accumulation number of −3 and a ROM 48 corresponding to a symbol section of the accumulation number of −3, symbol data (D0–D3) of a 4-bit data length are supplied from a ROM 43 corresponding to a symbol section of the accumulation number of −2 and a ROM 47 corresponding to a symbol section of the accumulation number of 2, symbol data (D0–D6) of a 7-bit data length are supplied from a ROM 44 corresponding to a symbol section of the accumulation number of −1 and a ROM 46 corresponding to a symbol section of the accumulation number of 1, and symbol data (D0–D7) of a 8-bit data length is supplied from a ROM 45 corresponding to a symbol section of the accumulation number of 0.

Outputs of these ROMs 40–50 are added by an adder 51 and converted into a 8-bit band-limited digital baseband signal of the I phase.

In this manner, the digital baseband signals output from the digital filters 25 and 26 of the I phase and the Q phase are respectively converted into analog baseband signals by the D/A converters 27 and 28 (FIG. 5) and applied to the modulation signal generation unit 31 (FIG. 5). The subsequent operations are the same as those of the prior art shown in FIG. 5.

In the above-described example of FIG. 9, a capacity of a ROM of each of the I phase and the Q phase is as follows. As to each of the ROMs 40–50 of FIG. 9, each ROM requires 4 bits (=2+2) as an address and its data length varies from one ROM to another as described above. That is, there exist four ROMs (40, 41, 49, 50) of a 2-bit data length, two ROMs (42, 48) of a 3-bit data length, two ROMs (43, 48) of 4-bit data length, two ROMs (44, 46) of 7-bit data length and one ROM (45) of 8-bit data length. Thus, the sum total capacity of 11 ROMs of each phase will be expressed as follows.

$$2^{(2+2)} \times 2 \times 4 + 2^{(2+2)} \times 3 \times 2 +$$
$$2^{(2+2)} \times 4 \times 2 + 2^{(2+2)} \times 7 \times 2 +$$
$$2^{(2+2)} \times 8 \times 1 = 704 \text{ bits}$$

The I phase and the Q phase together require a total of 1408 (=704×2) bits which is about 1/190650 the ROM capacity of 268 gigabits of the previously described prior art and is about 1/372 that of 524 kilobits of the prior art. It is therefore possible to realize a baseband signal generator for π/4 shift DQPSK modulation with an extremely small ROM capacity.

As described in the foregoing, the first embodiment of the present invention can realize a baseband signal generator for a digital modulator having a ROM capacity extremely smaller than that of the prior art. It is therefore possible to make a digital modulator easily as an LSI while reducing a manufacturing cost.

Figure 10:
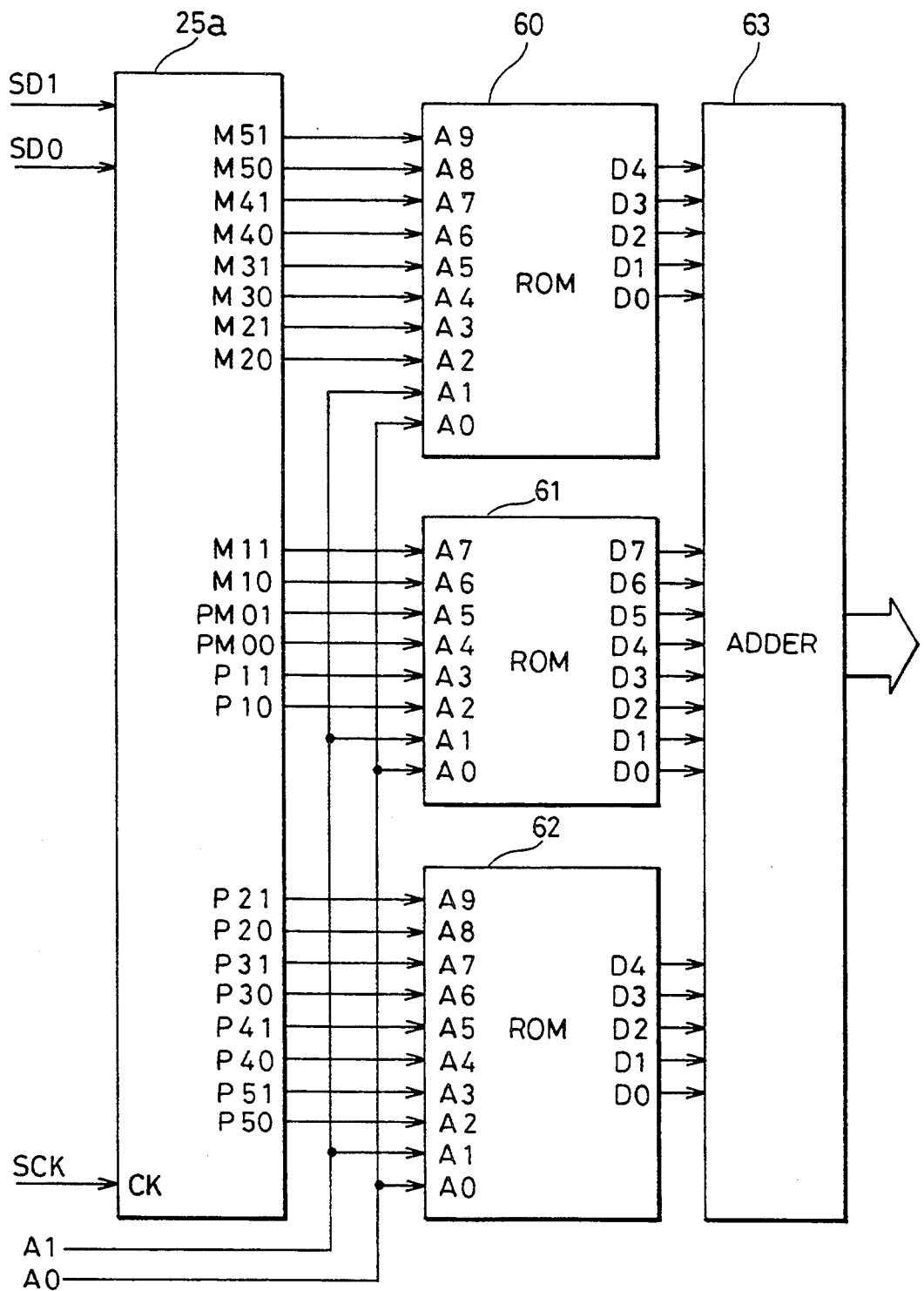
FIG. 10 is a block diagram showing a digital filter constituting a baseband signal generator according to a second embodiment of the present invention.

FIG. 10 is a block diagram showing a digital filter constituting a baseband signal generator according to a second embodiment of the present invention. Similar to the digital filter of FIG. 9, the digital filter shown in FIG. 10 corresponds to the digital filter 25 (or 26) of FIG. 5; the remainder, i.e., other than the digital filter, of the baseband signal generator of the second embodiment is the same as that of the prior art shown in FIG. 5. They description will not be therefore repeated herein.

The digital filter of the second embodiment shown in FIG. 10 is a modification example using the symbol tap divided ROM method of FIG. 9. In FIG. 10, a symbol mapping data accumulation circuit 25a is the same as that shown in FIG. 9. The symbol mapping data of 22-bit output from the symbol mapping data accumulation circuit 25a is divided into three groups and applied to corresponding ROMs 60 to 62. More specifically, the ROM60 uses 8-bit data (M20–M51) applied from the accumulation circuit 25a and 2-bit time information from the timing signal generation circuit 24 as an address (A0–A9), the ROM61 uses 6-bit data (P10–M11)and 2-bit time information as an address (A0–A7) and the ROM62 uses 8-bit data (P50–P21) and 2-bit time information as an address (A0–A9). A data length stored in these ROMs varies from one ROM to another depending on a dynamic range in each symbol section of an impulse response waveform of a route Nyquist filter having a roll off factor α of 0.5 shown in FIG. 7.

To be more specifically described, symbol data (D0–D4) of a 5-bit data length are supplied from the ROM 60 corresponding to the accumulation numbers of −5, −4, −3 and −2. This is because determination is made that 5 bits are enough for a response in each of these symbol sections in consideration of a dynamic range in each of these symbol sections. Similarly, symbol data (D0–D7) of a 8-bit data length are supplied form a ROM 61 corresponding to the accumulation numbers of −1, 0 and 1 in consideration of a dynamic range of each symbol section, while symbol data (D0–D4) of 5-bit data length are supplied from a ROM 62 corresponding to the accumulation numbers of 2, 3, 4 and 5. The outputs of these ROMs 60–62 are added by an adder and converted into 8-bit band-limited digital baseband signal of the I phase.

In this manner, the digital baseband signals output from the digital filters 25 and 26 of the I phase and the Q phase are converted into analog baseband signals by the corresponding D/A converters 27 and 28 (FIG. 5), respectively, and applied to the modulation signal generation unit 31 (FIG. 5). The subsequent operations are the same as those of the prior art of FIG. 5.

In the above-described example shown in FIG. 10, a capacity of a ROM of each of the I phase and the Q phase is as follows. That is, the ROMs 60 and 62 require 10 bits (=8+2) as each address and a data length of 5-bits. The ROM 61 requires 8 bits (=6+2) as an address and a data length of 8 bits. Therefore, the sum total capacity of the three ROMs of each phase will be expressed as follows.

$$2^{(8+2)} \times 5 + 2^{(6+2)} \times 8 + 2^{(8+2)} \times 5 = 12288 \text{ bits}$$

Therefore, the I phase and the Q phase together require a total of 24576 (=12288×2) bits, so that a baseband signal generator for $\pi/4$ shift DQPSK modulation can be realized to have an extremely small ROM capacity. As described in the foregoing, the second embodiment of the present invention also realizes a baseband signal generator for a digital modulator which has a considerably small ROM capacity, though not so small as that by the first embodiment. It is therefore easy to make a digital modulator as an LSI while reducing a manufacturing cost.

Figure 11:
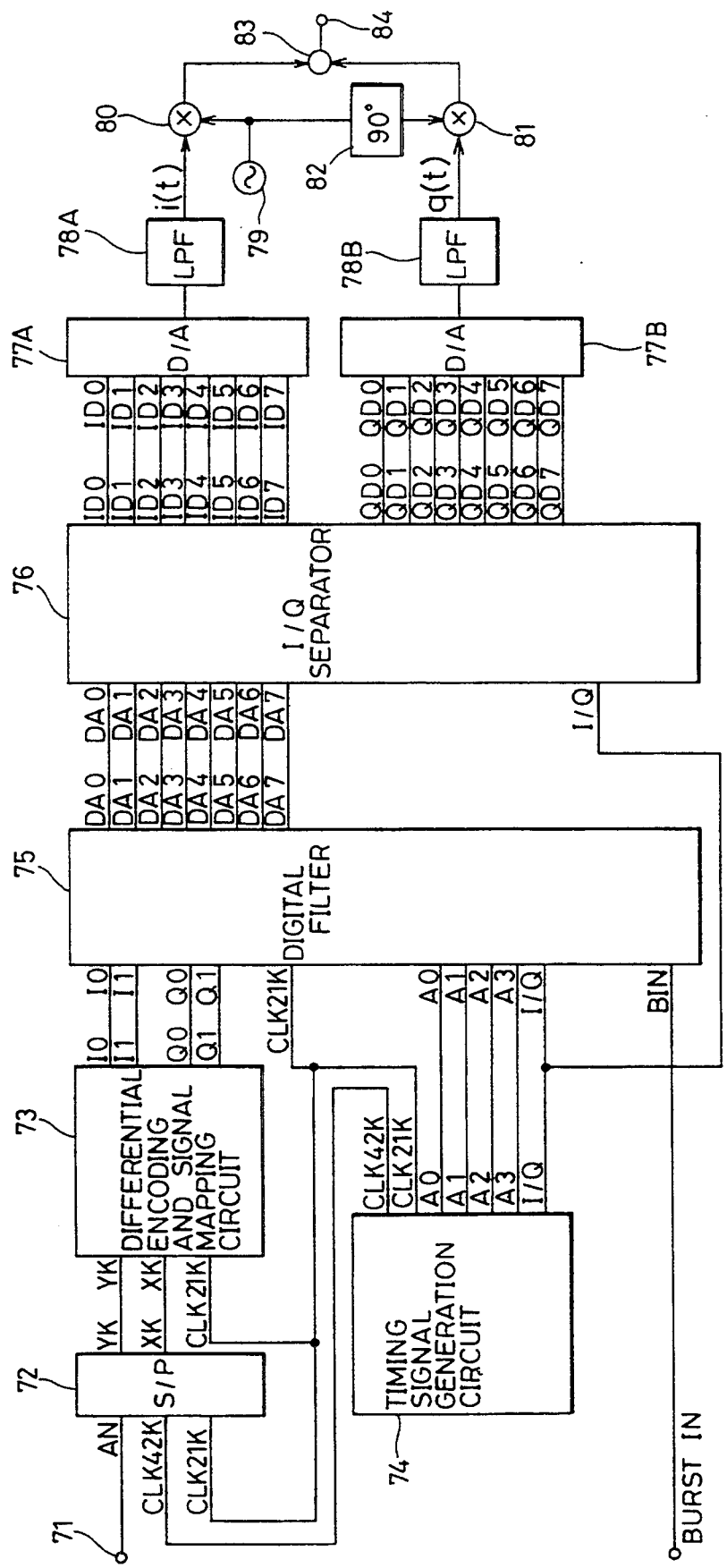
FIG. 11 is a block diagram showing a digital modulator including a baseband signal generator according to a third embodiment of the present invention.

FIG. 11 is a diagram showing an entire digital modulator including a baseband signal generator according to a third embodiment of the present invention. The third embodiment is directed to providing a baseband signal generator also applicable to burst transmission based on the symbol tap divided ROM method of the first embodiment as described above.

Figure 21:
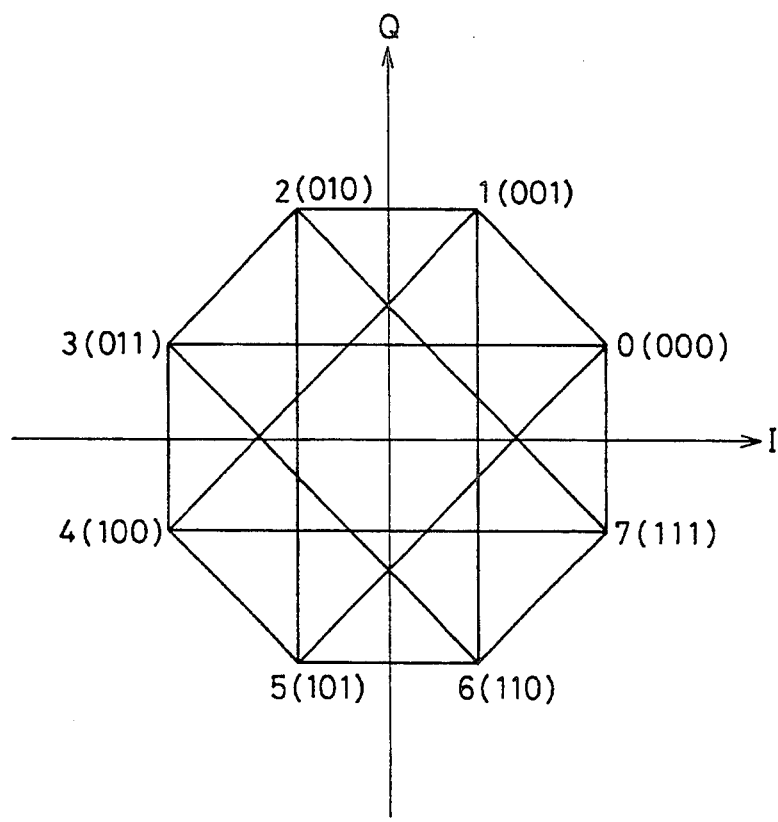
FIG. 21 is a diagram schematically illustrating the principle of operation of the differential encoding and mapping circuit of FIG. 11.

With reference to FIG. 11, a serial baseband signal AN applied through an input terminal 71 is converted into parallel 2-bit data (YK, XK) by a serial/parallel conversion circuit 72. A differential encoding and mapping circuit 73 differentially encodes the current 2-bit data from the serial/parallel conversion circuit 72 and 2-bit data of an immediately preceding clock and performs mapping on the signal spatial diagram—as graphically illustrated in FIG. 21. A timing signal generation circuit 74, shown in FIG. 11, is driven by a clock signal having a frequency higher than a symbol rate (21 KHz) to generate a clock signal for an input signal (CLK42K), a clock signal having a symbol period (CLK21K), and clock signals (A0, A1, A2, A3) and an I/Q switching signal (I/Q) for a digital filter.

Symbol mapping data (I0, I1) of the I phase and symbol mapping data (Q0, Q1) of the Q phase output from the differential encoding and mapping circuit 73 are band-limited by a digital filter 75 and output as 8-bit baseband signals (DA0-DA7). An I/Q separation circuit 76 separates the baseband signal which is an output of the digital filter 75 into baseband signals (ID0-ID7, QD0-QD7) of the I phase and the Q phase in response to the I/Q switching signal from the timing signal generation circuit 74. Then, the baseband signal (ID0-ID7) of the I phase is converted into an analog baseband signal (i(t)) of the I phase by a D/A converter 77A, while the baseband signal (QD0-QD7) of the Q phase is converted into an analog baseband signal (q(t)) of the Q phase by a D/A converter 77B.

Figure 1:
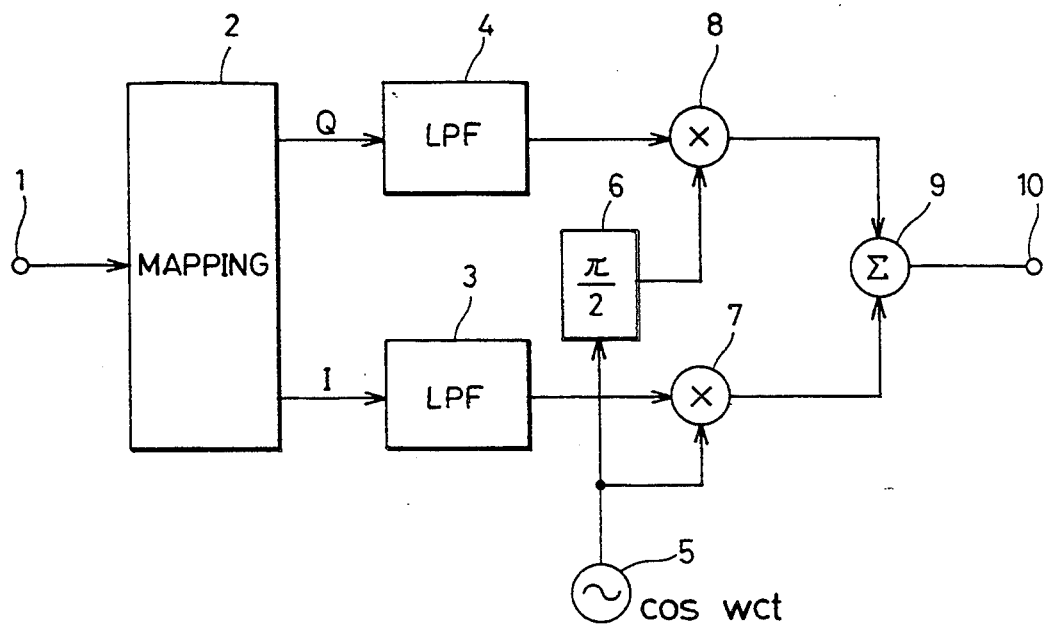
FIG. 1 is a block diagram schematically showing the principle of a quadrature modulator.
Figure 2:
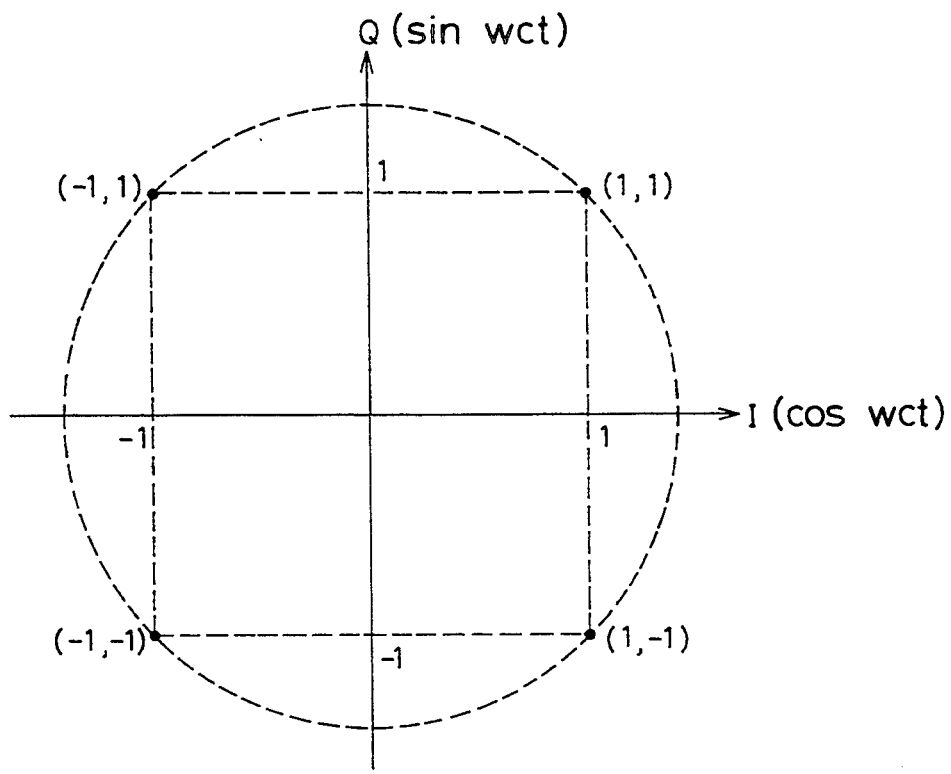
FIG. 2 is a spatial diagram schematically showing the principle of the quadrature modulator.
Figure 3:
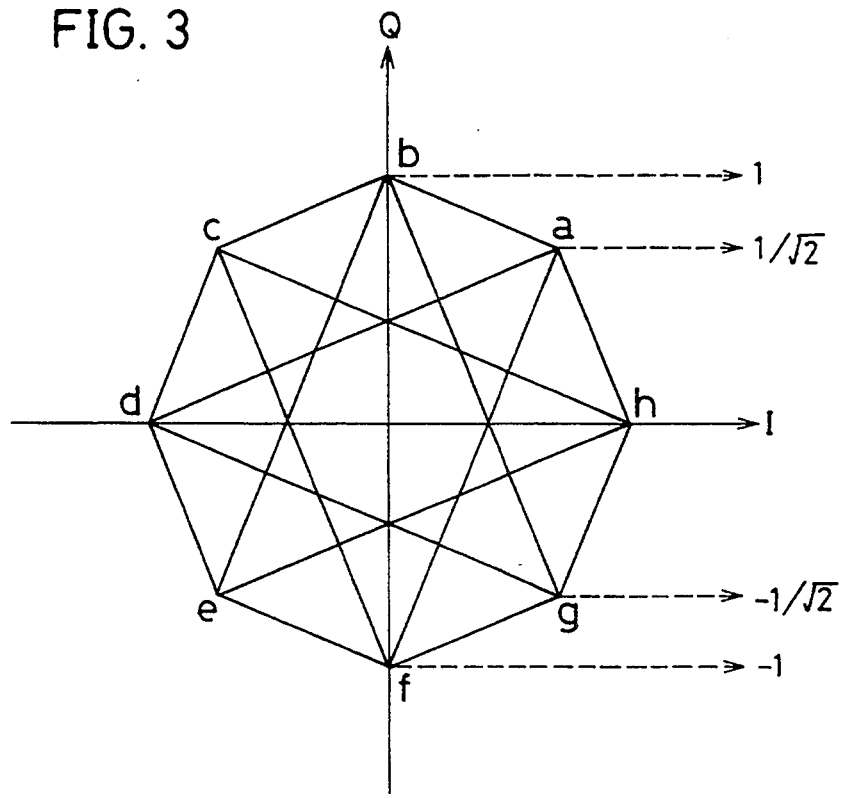
FIG. 3 is a diagram schematically illustrating the principle of generation of a $\pi/4$ shift QPSK signal.

Sampling noises of these analog baseband signals of the I phase and the Q phase are removed by LPFs 78A and 78B, respectively, and applied to an analog conversion unit of the same structure as those shown in FIGS. 1. More specifically, the analog baseband signal i(t) from the LPF 78A is applied to one input of a multiplier 80, while the analog baseband signal (q(t)) from the LPF 78B is applied to one input of a multiplier 81. The other input of the multiplier 80 receives a carrier signal from a signal source 79 to output an I phase component of a modulated signal. The other input of the multiplier 81 receives a signal obtained by shifting a phase of a carrier signal by $\pi/2$ by a phase shift circuit 82, thereby outputting a Q phase component of a modulated signal. These I phase component and Q phase component are added by an adder 83 and a result of the addition is output as an analog modulated signal from an output terminal 84.

Figure 12:
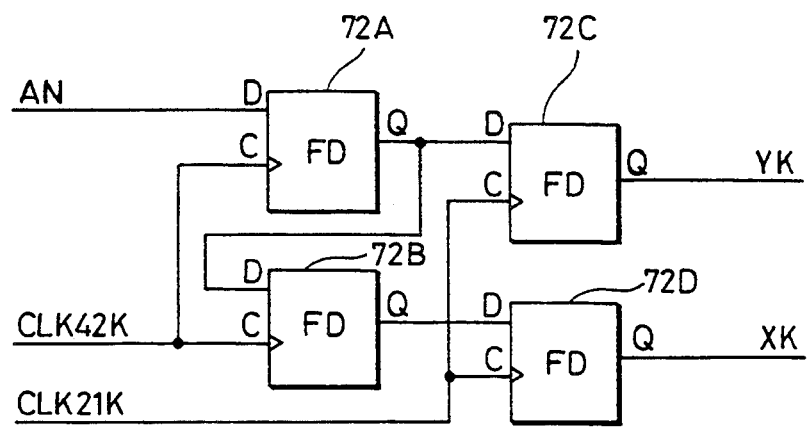
FIG. 12 is a diagram showing a serial/parallel conversion circuit of FIG. 11 in detail.

FIG. 12 is a diagram showing the serial/parallel conversion circuit 72 of FIG. 11 in detail. The serial/parallel conversion circuit 72 is structured by four flip-flops 72A, 72B, 72C and 72D as shown in FIG. 12. The serial data AN input through the input terminal 71 (FIG. 11) is sampled by a clock signal CLK 42K (42 KHz) having a data rate applied from the timing signal generation circuit 74 and accumulated by two bits in the flip-flops 72A and 72B. The accumulated data are further sampled by a clock signal CLK21K (21 KHz) having a symbol period applied from the timing signal generation circuit 74 and output as 2-bit parallel data (YK, XK).

Figure 4:
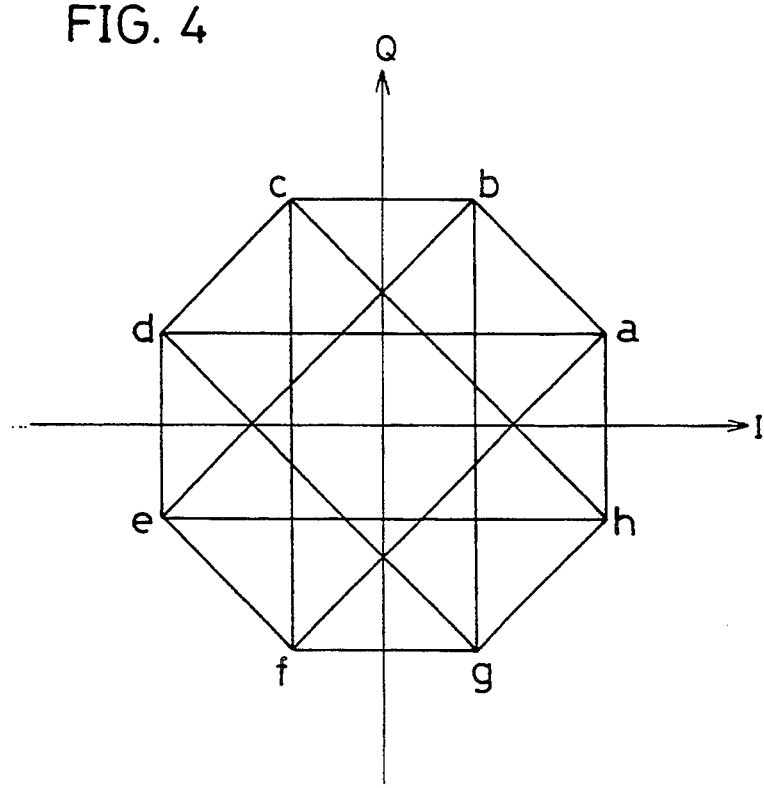
FIG. 4 is a diagram schematically showing the principle of differential encoding.
Figure 13:
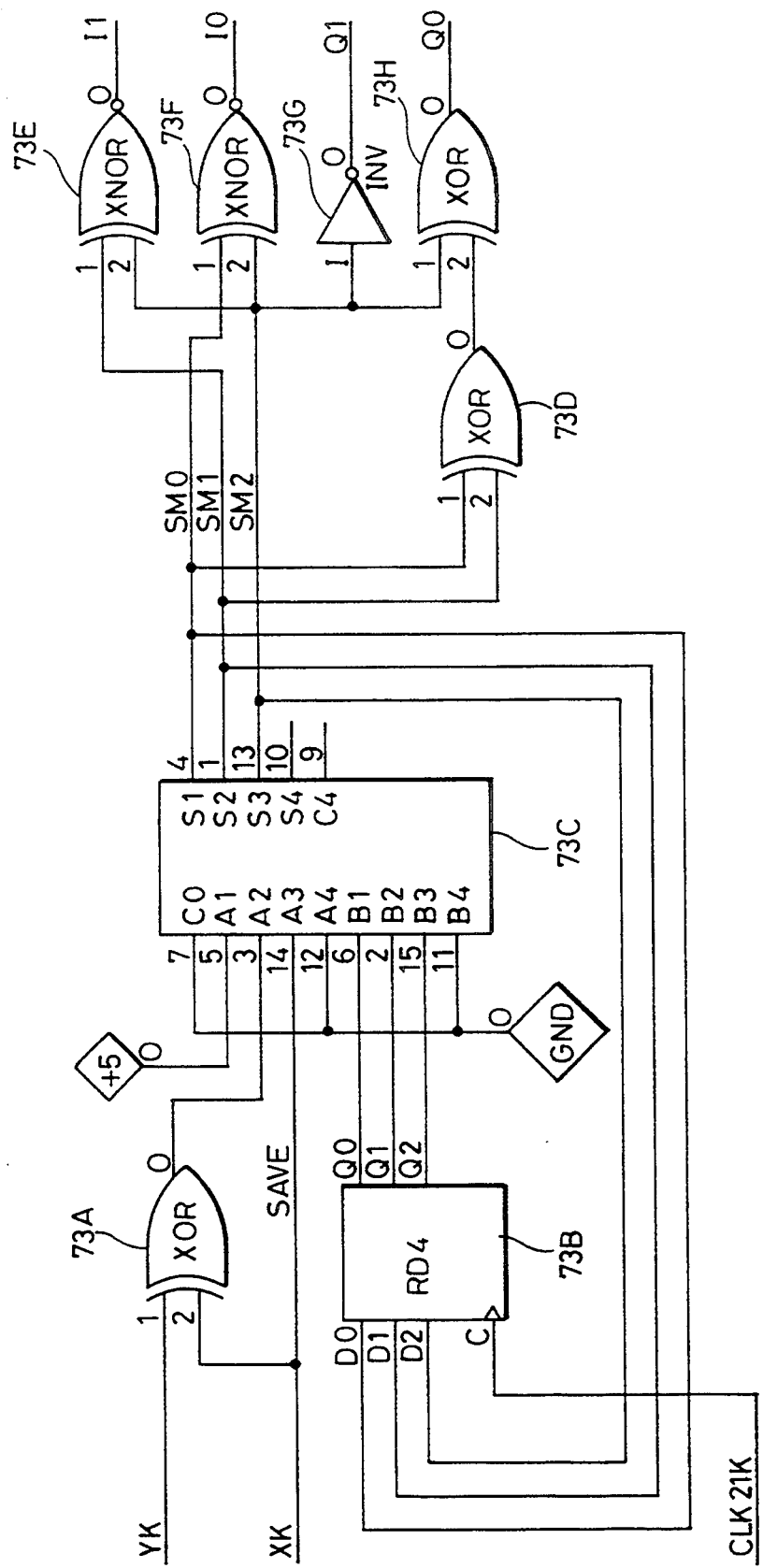
FIG. 13 is a diagram showing a differential encoding and mapping circuit of FIG. 11 in detail.

FIG. 13 is a diagram showing the structure of the differential encoding and mapping circuit 73 of FIG. 11 in detail. The differential encoding and mapping circuit 73 carries out differential encoding and mapping of the 2-bit data (XK, YK) applied from the above-described serial/parallel conversion circuit 72. Herein, there exist eight points as indicated by a–h in FIG. 4 necessary for presenting phases in case of $\pi/4$ shift DQPSK.

For simplification of calculation, the phase states of these points a–h are expressed in decimal notation such as "0", "1", "2", "3", "4", "5", "6" and "7" for "a", "b", "c", "d", "e", "f", "g" and "h", respectively (see FIG. 12).

A numerical value among 0–7 indicative of phase point of a current symbol is obtained by adding "1", "5" and "7" to the numerical value among 0–7 indicative of a phase point of an immediately preceding symbol, when the 2-bit data (XK, YK) of the current symbol is (0, 0), (0, 1) and (1, 1), respectively, and performing MOD8 operation on the result.

The MOD8 operation is an operation of obtaining residues of division of a certain numerical value by 8. Since the numerical values of 0–7 indicative of the phase points are operated in the form of 3-bit binary codes in the actual circuit shown in FIG. 13, the numerical values of 1, 3, 5 and 7 to be added to a numerical value of a phase point of an immediately preceding symbol are binary-encoded by using an exclusive OR gate (EXOR) 73A. In addition, the numerical value among 0–7 at a phase point of an immediately preceding symbol is stored in a 3-bit parallel resistor 73B.

The 3-bit data output from the EXOR 73A and the 3-bit data output from the 3-bit parallel resister 73B are added to each other by an adder 73C to obtain 3-bit outputs SM0, SM1 and SM2. Mapping operation of logic circuits 73D, 73E, 73F, 73G and 73H based on the 3-bit data SM0, SM1 and SM2 generate symbol mapping data I0, I1, Q0 and Q1. In other words, out of the above-described logic circuits, the exclusive NOR gate (EXNOR) 73E is used to output the symbol mapping data I1, the exclusive NOR gate (EXNOR) 73F to output the symbol mapping data I0, the inverter 73G to output the symbol mapping data Q1 and the exclusive OR gates (EXOR) 73D and 73H to output the symbol mapping data Q0. The mapping operation is carried out following the truth table shown in FIG. 14.

Figure 15:
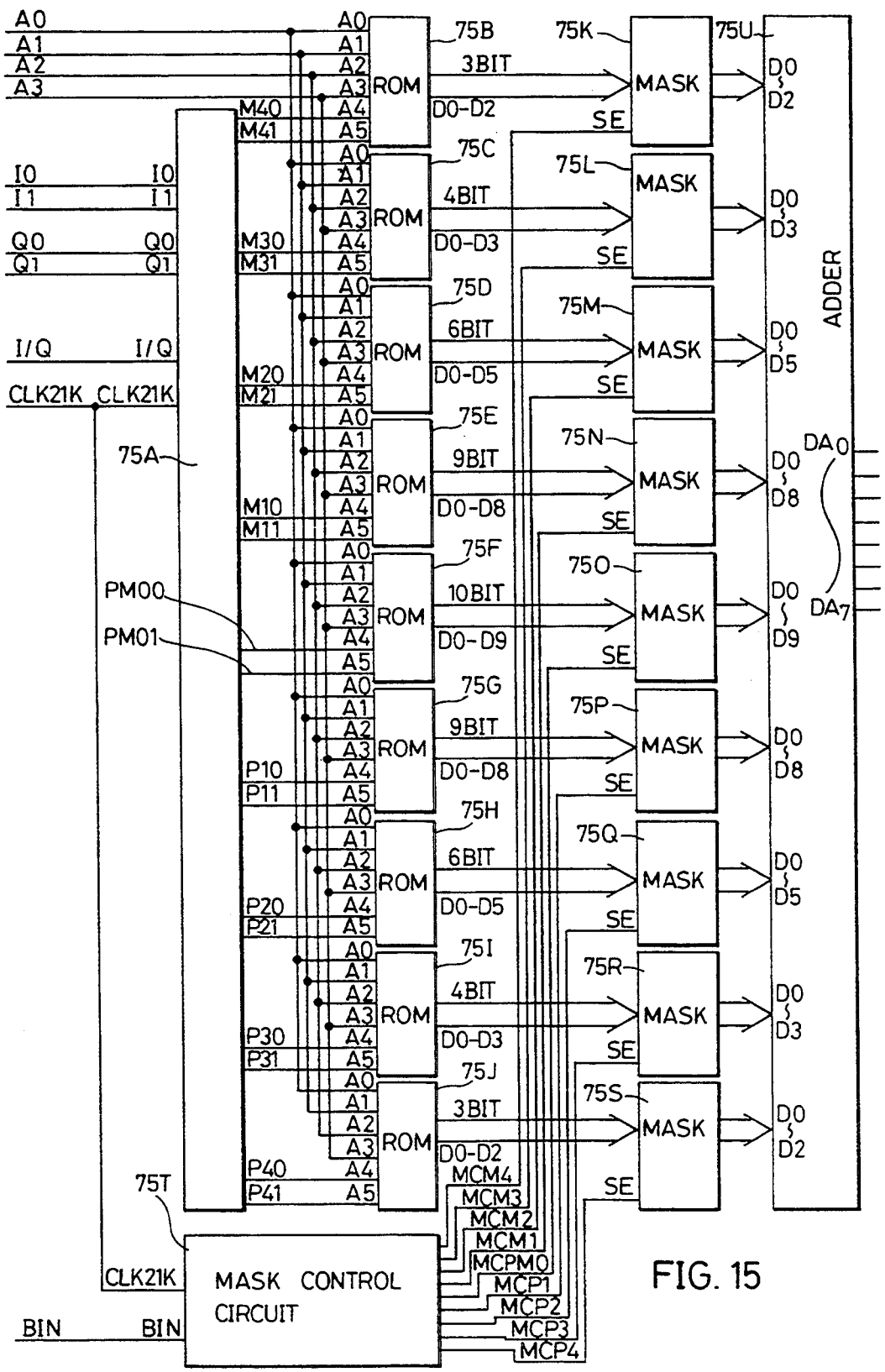
FIG. 15 is a diagram showing the detailed structure of the digital filter shown in FIG. 11.

FIG. 15 is a diagram showing the digital filter 75 of FIG. 11 in detail. Similar to the digital filter according to the first embodiment shown in FIG. 9, the digital filter of FIG. 15 basically uses the symbol tap divided ROM method. However, unlike the example of FIG. 9, it is assumed in the example of FIG. 15 that data are accumulated in a symbol mapping data accumulation circuit 75A, the data corresponding to four symbol sections preceding to the center symbol section and succeeding four symbol sections, that is, corresponding to the total of 9 symbol sections (9, the number of taps of ROM), More specifically, the symbol mapping data accumulation circuit 75A is time-divisionally used for the I phase and the Q phase to accumulate, by the amount equivalent to 9 symbol sections, the symbol mapping data (I0, I1) of the I phase or the symbol mapping data (Q0, Q1) of the Q phase supplied from the differential encoding and mapping circuit 73 and shifted by a clock signal CLK21K (21 KHz) having a symbol period supplied from the timing signal generation circuit 74.

Figure 16:
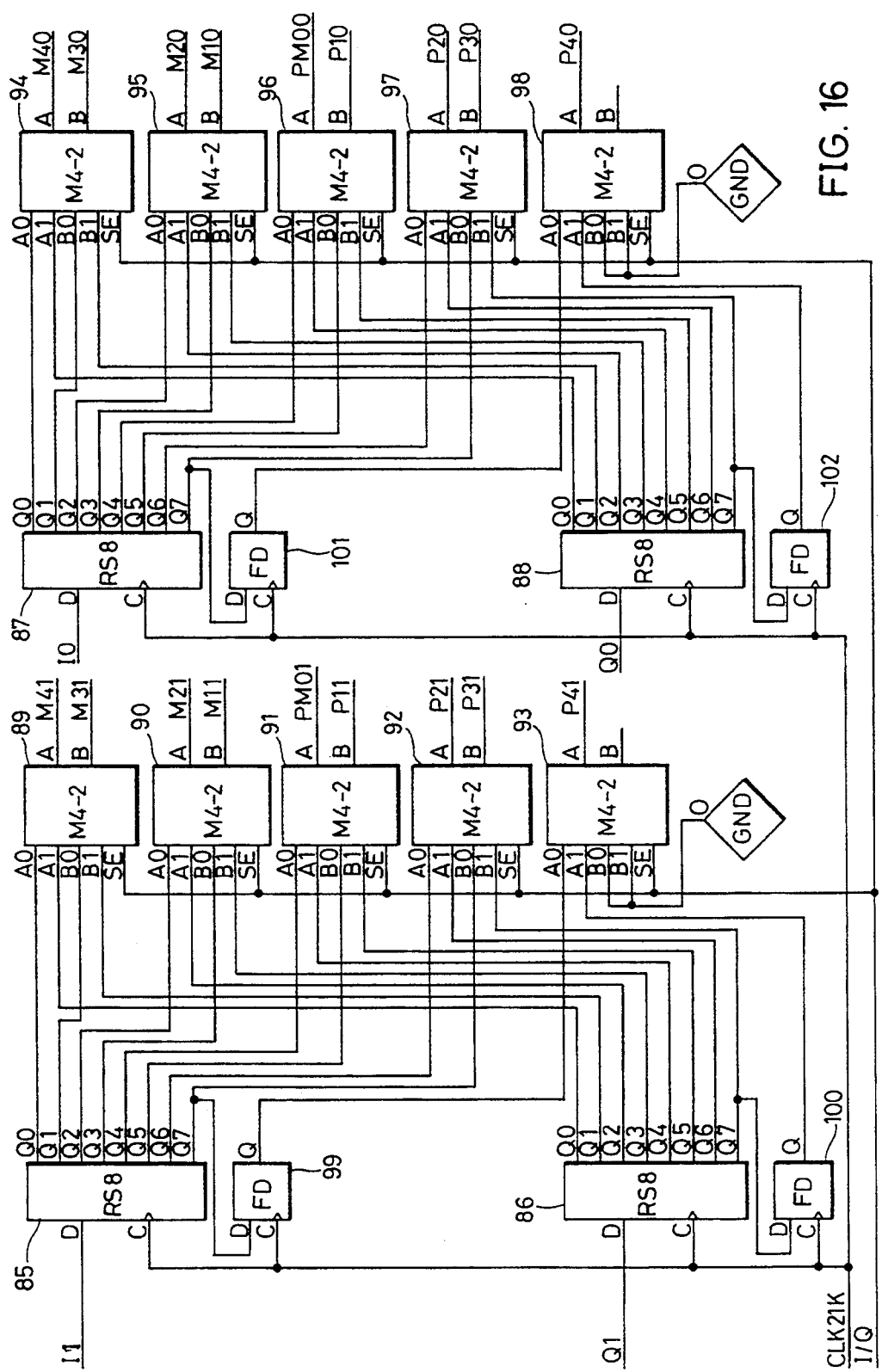
FIG. 16 is a diagram showing the detailed structure of a symbol mapping data accumulation circuit shown in FIG. 15.

FIG. 16 is a diagram showing the structure of such symbol mapping data accumulation circuit 75A in detail. As shown in FIG. 16, the symbol mapping data accumulation circuit 75A is structured by four 8-bit shift resisters 85–88, eight 2-bit data selectors 89–98 and four flip-flops 99–102. Each of the 2-bit data selectors 89–98 selectively outputs 2-bit symbol mapping data of the phase or 2-bit symbol mapping data of the Q phase in response to an I/Q switching signal supplied from the I timing signal generation circuit 74 of FIG. 11.

With reference to FIG. 15, 18-bit symbol mapping data for nine symbol sections output from the symbol mapping data accumulation circuit 75A are applied to corresponding ROMs 75B–75J for respective symbol sections. Each of these ROMs uses its corresponding 2-bit symbol mapping data (A4, A5) from the symbol mapping data accumulation circuit 75A and 4-bit (16 values) time information (A0, A1, A2, A3) from the timing signal generation circuit 74 as addresses, and a data length stored in each ROM varies from one ROM to another defending on a dynamic range in each symbol section of an impulse response waveform of a route Nyquist filter having a roll off factor α of 0.5 shown in FIG. 7.

More specifically, the ROM 75B corresponding to a symbol section of the accumulation number of −4 and the ROM 75J corresponding to a symbol section of the accumulation number of 4 output symbol data (D0–D2) of a 3-bit data length in consideration of a dynamic range of each symbol section. Similarly, the ROM 75C corresponding to a symbol section of the accumulation number of −3 and the ROM 75I corresponding to a symbol section of the accumulation number of 3 supply symbol data (D0–D3) of a 4-bit data length, the ROM 75D corresponding to a symbol section of the accumulation number of −2 and the ROM 75H corresponding to a symbol section of the accumulation number of 2 supply symbol data (D0–D5) of a 6-bit data length, the ROM 75E corresponding to a symbol section of the accumulation number of −1 and the ROM 75G corresponding to a symbol section of the accumulation number of 1 supply symbol data of a 9-bit data length and the ROM 75F corresponding to a symbol section of the accumulation number of 0 supplies symbol data (D0–D9) of a 10-bit data length.

The outputs of these ROMs 75B–75J are applied to corresponding masking circuits 75K to 75S, respectively. These masking circuits serve to prevent generation of spurious transmission by temporarily masking outputs of the ROM s at the time of burst transmission. As shown in FIG. 15, the number n of input bits and the number n of output bits of each masking circuit are equal to each other and each masking circuit is structured by n AND gates.

Figure 17:
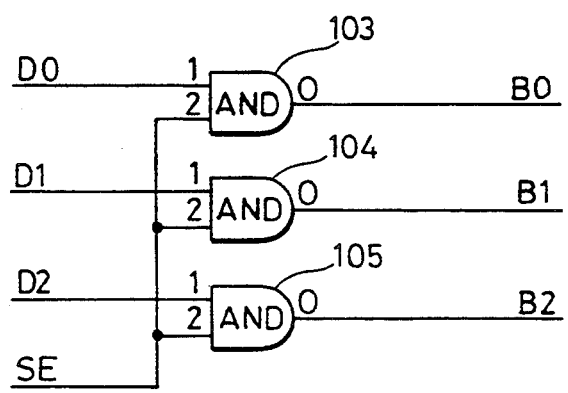
FIG. 17 is a diagram showing an example of a structure of a masking circuit shown in FIG. 15.

FIG. 17 is a diagram showing the structure of the masking circuit 75K or 75S as an example of a structure of such a masking circuit. In the example shown in FIG. 17, the masking circuit has a 3-bit input and a 3-bit output and is structured by three AND gates 103–105. When a control output SE from a mask control circuit 75T is "1", the masking circuit outputs the inputs D0–D2 as outputs B0–B2, while when the SE is "0", the outputs B0–B2 all attain "0". As for the remaining masking circuits 75L–75R, their structures are basically the same except that the number of AND gates varies according to the number of input and output bits.

Figure 18:
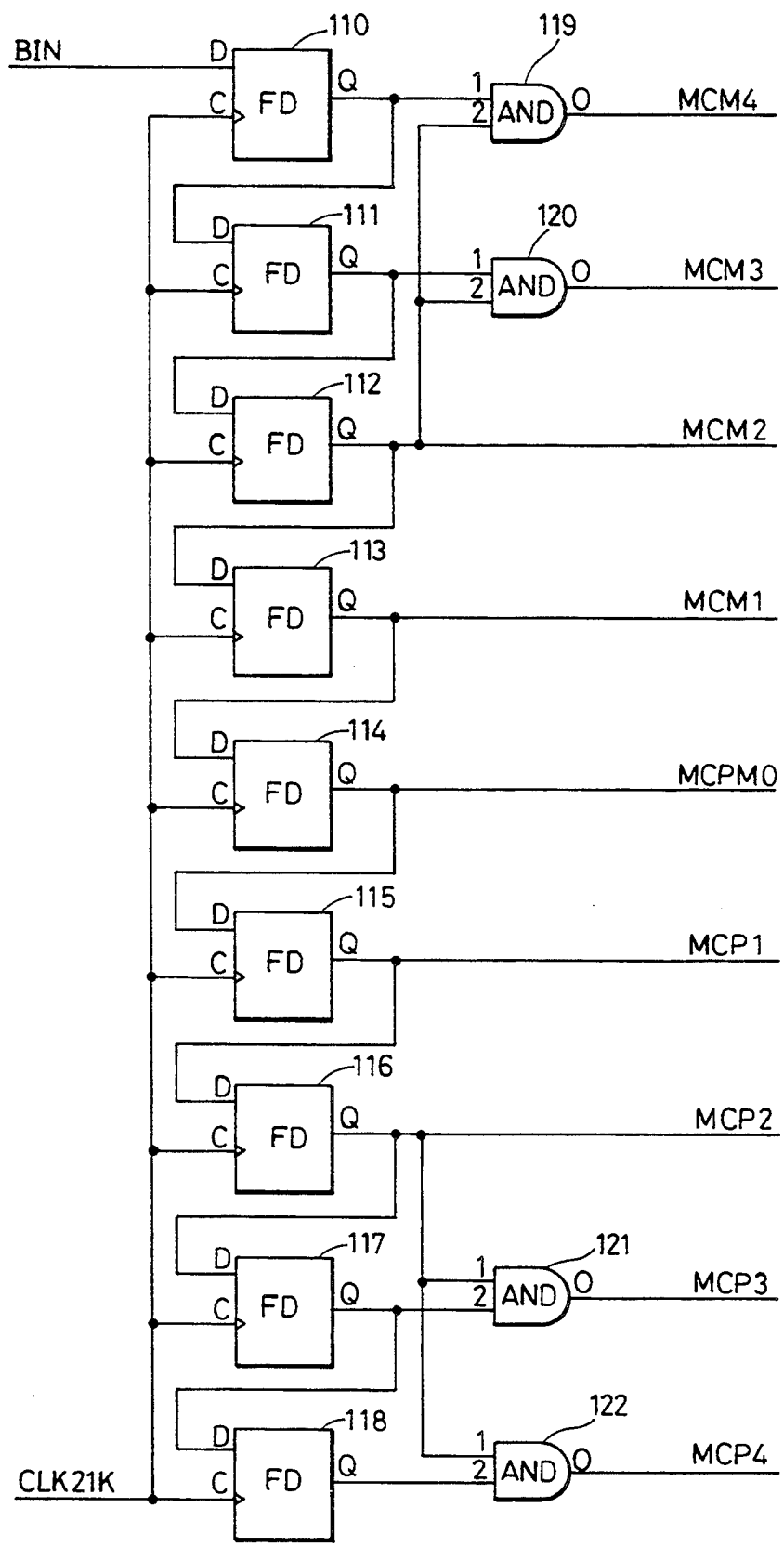
FIG. 18 is a diagram showing a structure of a mask control circuit shown in FIG. 15.
Figure 19:
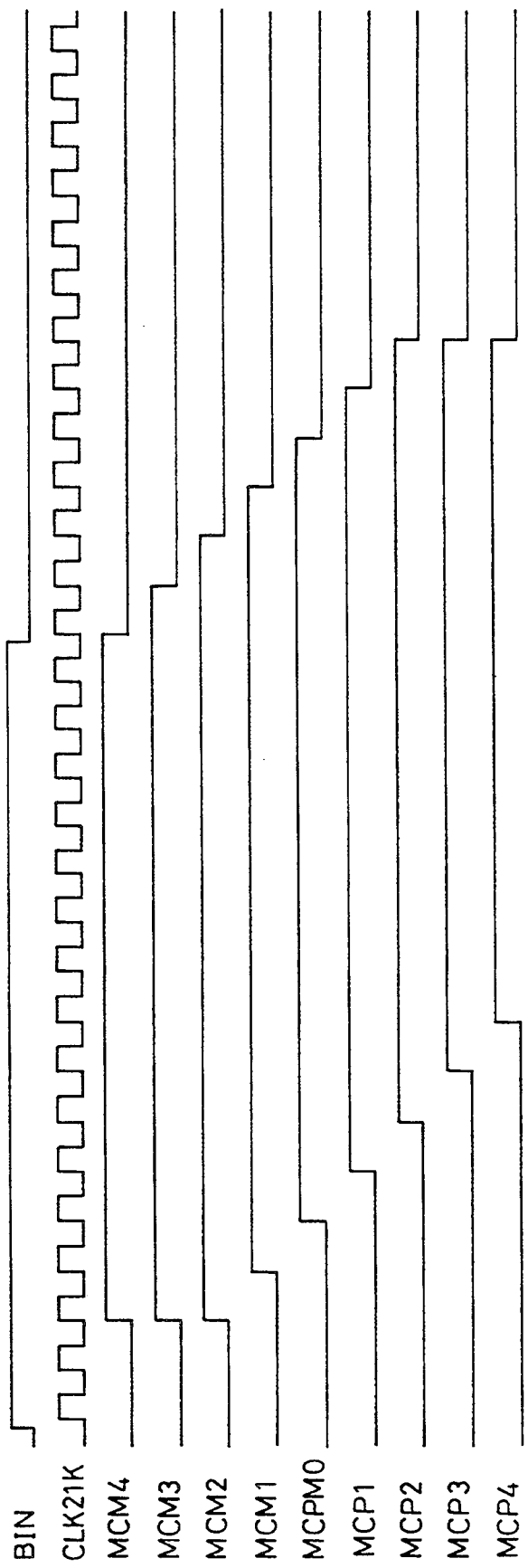
FIG. 19 is a timing chart illustrating operation of the mask control circuit of FIG. 18.

FIG. 18 is a block diagram showing the structure of the mask control circuit 75T of FIG. 15. As shown in FIG. 18, the mask control circuit 75T is structured by nine flip-flops 110 to 118 and four AND gates 119 to 122. FIG. 19 is a timing chart illustrating operation of the mask control circuit 75T. With reference to FIGS. 18 and 19, the operation of the mask control circuit 75T will be described in the following.

First, at a rising edge of a burst transmission, a burst input signal BIN input through the burst input terminal of FIG. 11 changes from "0" to "1". Then, after two to three symbol periods, control outputs MCM4, MCM3 and MCM2 corresponding to the masking circuits 75K–75M simultaneously change from "0" to "1" and further thereafter, control outputs MCM1, MCPM0, MCP1, MCP2, MCP3 and MCP4 corresponding to the remaining masking circuits sequentially change from "0" to "1" in a symbol period.

Thereafter, at a falling edge of the burst transmission, the burst input signal BIN input from the burst input terminal changes from "1" to "0". Then, the control outputs MCM4, MCM3, MCM2, MCM1, MCPM0 and MCP1 are sequentially changed from "1" to "0" with a delay of a symbol period and in one symbol period later, MCP2, MCP3 and MCP4 are simultaneously changed from "1" to "0".

Thus, by sequentially masking the outputs of ROMs 75B–75J at a timing shown in FIG. 19 at the time of burst transmission, a ramp processing at a rise and a fall of burst is possible to prevent generation of transmission spurious.

The outputs of the above-described masking circuits 75K–75S are added as shown in FIG. 15, by an adder 75U to be changed into a 8-bit digital baseband signal. Although the output of the adder 75U essentially should be of 10 bits because the output of the ROM 75F corresponding to a symbol section of the accumulation number of 0 is of 10 bits. However, in consideration of an increase in error included in LSB as a result of addition, the output is set to be of 8-bit by omitting two digits of the LSB.

Figure 20:
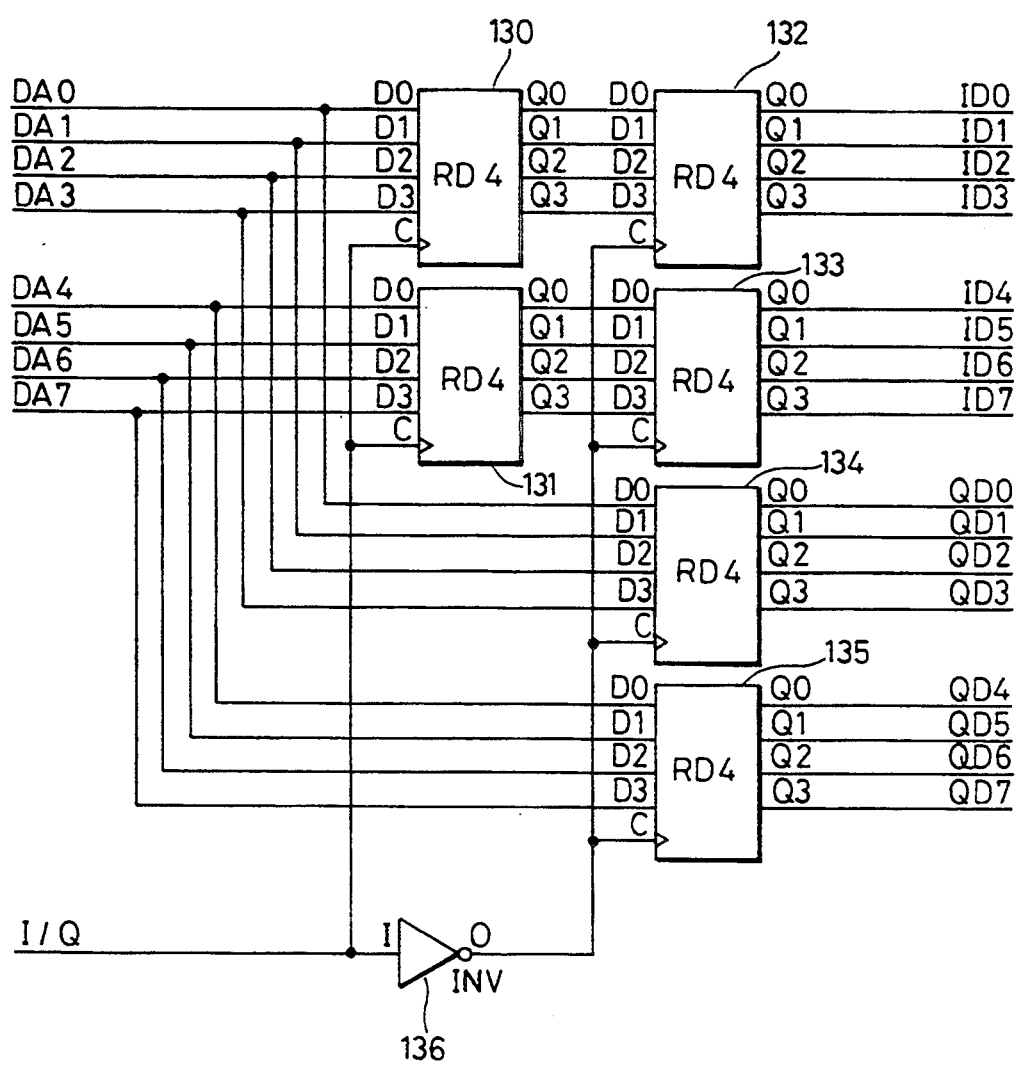
FIG. 20 is a block diagram showing a structure of an I/Q separation circuit shown in FIG. 11.

FIG. 20 is a block diagram showing the I/Q separation circuit 76 of FIG. 11 in detail. As described in the foregoing, the 8-bit digital baseband signal from the digital filter 75 is output in the form of the I phase and the Q phase components time divisionally multiplexed. Then, the I/Q separation circuit 76 separates the signal into a baseband signal of the I phase and a baseband signal of the Q phase. As shown in FIG. 20, the I/Q separation circuit 76 is structured by six 4-bit parallel resisters 130–135 and the inverter 136, wherein 8-bit input baseband signals DA0–DA7 are separated into 8-bit baseband signals ID0–ID7 of the I phase and 8-bit baseband signals QD0–QD7 of the Q phase in response to the I/Q switching signal from the timing signal generation circuit 74. Subsequent processings of these baseband signals are already described in connection with FIG. 11 and no further description will be made.

An ROM capacity of the third embodiment is as follows. That is, an address of each of ROMs 75B–75J has 6 bits (=4+2) and each data length varies from one ROM to another as described in the foregoing. Provided are two 3-bit ROMs, two 4-bit ROMs, two 6-bit ROMs, two 9-bit ROMs and one 10-bit ROM. The sum total of the capacities of the nine ROMs is therefore expressed as follows.

$$2^{(4+2)} \times 3 \times 2 + 2^{(4+2)} \times 4 \times 2 +$$
$$2^{(4+2)} \times 6 \times 2 + 2^{(4+2)} \times 9 \times 2 +$$
$$2^{(4+2)} \times 10 \times 1 = 3456 \text{ bits}$$

While in the above-described third embodiment, a case is made of masking a ROM output by using a masking circuit comprised of AND gates, the masking circuit of FIG. 15 will be unnecessary if each ROM is provided with an address or a dedicated input terminal which renders output data "0". In this case, the control outputs MCM4 to MCP4 of the mask control circuit 75T of FIG. 15 may be connected to the above-described address or the dedicated input terminal which renders the output data "0", and the outputs of the respective ROMs may be directly applied to the adder 75U.

As described in the foregoing, the third embodiment of the present invention enables reduction of a ROM capacity while preventing generation of spurious transmission at the time of burst transmission, which leads to a provision of a baseband signal generator for a digital modulator applicable to burst transmission.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. The baseband signal generator for a digital modulator, comprising:
   means for supplying a digital baseband signal,
   means for performing a differential encoding processing and a mapping processing for said digital baseband signal to convert the signal into a plurality of symbol mapping data of different phases,
   a plurality of digital filtering means for limiting respective bandwidths of said plurality of symbol mapping data,
   means for designating burst transmission,
   each of said plurality of digital filtering means including:
      means for accumulating said symbol mapping data by the amount corresponding to a plurality of symbol sections,
      a plurality of read only memory means provided corresponding to said plurality of symbol sections for storing symbol data read out corresponding to a predetermined filter waveform,
      output masking means for selectively rendering said symbol data read out from said plurality of read only memory means to "0",
      mask controlling means responsive to a designation of burst transmission by said burst transmission designating means for controlling said output masking means in a predetermined timing, and
      means for adding the symbol data read out from said plurality of read only memory means, and
   a plurality of converting means for converting outputs of said plurality of digital filtering means into analog baseband signals.

2. The baseband signal generator according to claim 1, wherein said plurality of read only memory means is provided in one-to-one correspondence with said plurality of symbol sections, each of said plurality of read only memory means being addressed by symbol mapping data of a corresponding symbol section to output data corresponding to an impulse response waveform of the route Nyquist filter in a corresponding symbol section.

3. The baseband signal generator according to claim 2, wherein a data length of each of said plurality of read only memory means is determined according to a dynamic range of impulse response characteristics of a route Nyquist filter in a corresponding symbol section.

4. The baseband signal generator according to claim 1, wherein said mask controlling means sequentially controls said output masking means on the basis of a symbol period so as to perform a ramp processing at a rising edge and a falling edge of burst transmission.

5. The baseband signal generator according to claim 1, wherein said output masking means includes a plurality of logic gate means provided corresponding to said plurality of read only memory means, each of said logic gate means being closed and opened by the output of said mask controlling means.

6. The baseband signal generator according to claim 1, wherein said plurality of digital filtering means are realized by a time-divisional use of a single digital filtering means.

* * * * *